(12) United States Patent
Hannuksela et al.

(10) Patent No.: US 7,826,536 B2
(45) Date of Patent: Nov. 2, 2010

(54) TUNE IN TIME REDUCTION

(75) Inventors: Miska Hannuksela, Ruutana (FI); Mehdi Rezaei, Tempere (FI)

(73) Assignee: Nokia Corporation, Espoo (FI)

( * ) Notice: Subject to any disclaimer, the term of this patent is extended or adjusted under 35 U.S.C. 154(b) by 1343 days.

(21) Appl. No.: 11/275,394

(22) Filed: Dec. 29, 2005

(65) Prior Publication Data

US 2007/0153914 A1 Jul. 5, 2007

(51) Int. Cl.
*H04N 5/44* (2006.01)
*G06F 13/00* (2006.01)

(52) U.S. Cl. .................... 375/240.26; 725/38; 725/105; 348/725; 348/731

(58) Field of Classification Search ............ 375/240.26; 725/38, 105; 348/725, 731; 370/394, 487, 370/498
See application file for complete search history.

(56) References Cited

U.S. PATENT DOCUMENTS

| 6,529,550 B2 * | 3/2003 | Tahara et al. ................. 375/240 |
| 2006/0107189 A1 | 5/2006 | Wenger |
| 2006/0109805 A1 | 5/2006 | Malamal Vadakital |
| 2006/0146853 A1 | 7/2006 | Paila |

FOREIGN PATENT DOCUMENTS

| WO | 03069885 A2 | 8/2003 |
| WO | 2004086656 A1 | 10/2004 |
| WO | 2004110069 A1 | 12/2004 |

OTHER PUBLICATIONS

PCT/IB2006/003424, International Search Report dated Sep. 21, 2007.

Nokia, Reduction of Tune-In Delay in MBMS Streaming, 3GPP TSG-SA4#33, Nov. 22-26, 2004.

Rezaei Mehdi et al., "Video Encoding and Splicing for Tune-In Time Reduction in IP Datacasting (IPDC) over DVB-H", 2006 IEEE International Conference on Multimedia and Expo, Jul. 9-12, 2006, Toronto, Ont. Canada, IEEE 2006, pp. 601-604.

(Continued)

*Primary Examiner*—Scott A Rogers
(74) *Attorney, Agent, or Firm*—Banner & Witcoff, Ltd.

(57) ABSTRACT

The time until a media decoder is refreshed to produce correct output samples is minimized if an IDR picture is the first picture in a decoding order in each MPE-FEC frame. A system enabling minimization of tune-in delay is described. Aspects of the system include a content encoder for receiving a source signal including first and second bit streams and for encoding the first and second bit streams, the encoded first bit stream including a decoder refresh bit stream and the encoded second bit stream including a media bit stream. A server receives the encoded first and second bit streams and encapsulates the encoded first and second bit streams into packets. An encapsulator then receives the packets and composes a time-sliced multi-protocol encapsultation (MPE) stream by replacing a spliceable picture from the encoded second bit stream.

75 Claims, 4 Drawing Sheets

OTHER PUBLICATIONS

Rezaei Mehdi et al., "Video Splicing and Fuzzy Rate Control in IP Multi-Protocol Encapsulator for Tune-In Time Reduction in EP Datacasting (IPDC) Over DVB-H", 2006 International Conference on Image Processing, Oct. 8-11, 2006, Atlanta, GA, USA, IEEE 2006, pp. 3041-3044.

Rezaei Mehdi et al., "Spliced Video and Buffering Considerations for Tune-In Time Minimization in DVB-H for Mobile TV", 2006 IEEE 17th International Symposium on Personal, Indoor and Mobile Radio Communications, Sep. 11-14, 2006, Helsinki, Finland, IEEE 2006, 5 pages.

Karczewicz, et al., "The SP- and SI-Frames Design for H.264/AVC", 2003 IEEE Transations on Circuits and Systems for Video Technology, vol. 13, No. 7, Jul. 2003, pp. 637-644.

Nokia, Multimedia Broadcast/Multicast Service (MBMS) Protocols and Codecs, 3GPP TS 26.346 V6.2.0, Nov. 29, 2005.

L.X. Wang, Adaptive Fuzzy System and Control: Design and Stability Analysis, Englewood Cliffs, NJ: Prentice-Hall, 1994, pp. 164-181.

* cited by examiner

TUNE IN TIME REDUCTION

FIELD OF THE INVENTION

The present invention relates generally to broadcast communication transmissions. More specifically, the present invention relates to a system and method for Internet protocol (IP) data casting over systems such as digital video broadcast-handheld DVB-H protocol systems.

BACKGROUND

In an effort to extend their scope of offered services, the digital video broadcasting (DVB) organization specified protocols to broadcast data multiplexed along with traditional digital television (DTV) contents. This broadcast of data is termed data casting. Based on the requirements of different applications using data casting, six (6) profiles were specified. These profiles are identified as data piping, data streaming, multi-protocol encapsulation, data carousels, object carousels, and higher protocols based on asynchronous data streams.

The ever growing demand for IP based services required an intermediate layer that handled the incompatibilities between the Internet's IP architecture and the broadcasting protocol architecture of the DVB organization. This intermediate layer is included as one of the profiles in the data casting specification as the multi-protocol encapsulation profile. In the multi-protocol encapsulation profile, OSI layer 3 datagrams are encapsulated into multi-protocol encapsulated (MPE) sections according to the DVB organization's private data Digital Storage Media—Command and Control (DSM-CC) specifications. The MPE sections are then mapped onto a stream of 188 byte MPEG-2 system layer transport stream (TS) packets.

The DVB physical layer protocol differs based on the physical channel that the services are transported on. Consequently, different protocols for satellite (DVB-S), cable (DVB-C) and terrestrial (DVB-T) are specified. DVB-T which was primarily developed for fixed reception with roof-top directive antenna is also found to be efficient for mobile data services, yet not very efficient for small handheld, low powered battery operated terminals. Handheld mobile terminals require specific features from the transmission system serving them. These features include extended receiver battery life, improved RF performance for mobile single antenna reception, counter high levels of noise in a hostile transmission environment, and efficient handover.

DVB-H enhances DVB-T specifications to incorporate the above-mentioned features by including an optional Reed Solomon forward error correction (RS-FEC) computed across MPE section payloads, called MPE-FEC, and time slicing of the MPE and MPE-FEC sections.

In Internet protocol (IP) data casting over digital video broadcast-handheld (DVB-H) protocol, the encapsulation to multi-protocol encapsulated frames with Reed Soloman forward error correction (MPE-FEC) occurs within an IP encapsulator and is therefore beyond the control of a content encoder. Due to the system architecture, a content encoder and an IP encapsulator lack a real-time feedback link that allows the IP encapsulator to govern the exact location of instantaneous decoding refresh (IDR) pictures in an encoded bit stream.

Tune-in delay refers to the time between the start of reception of a broadcast signal and the start of media rendering. One factor in tune-in delay is the time until a media decoder is refreshed to produce correct output samples.

SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

The time until a media decoder is refreshed to produce correct output samples is minimized if an IDR picture is the first picture in a decoding order in each MPE-FEC frame. The invention presents a system enabling minimization of tune-in delay.

In accordance with one embodiment of the present invention, the present invention contemplates a system and method for transmitting a time sliced multi-protocol encapsulated stream to a receiver. The system may include a content encoder for receiving a source signal including first and second bit streams and for encoding the first and second bit streams, the encoded first bit stream including a decoder refresh bit stream and the encoded second bit stream including a media bit stream. A server receives the encoded first and second bit streams and encapsulates the encoded first and second bit streams into packets. An encapsulator then receives the packets and composes a time-sliced multi-protocol encapsultation (MPE) stream by replacing a spliceable picture from the encoded second bit stream.

Another aspect of the present invention provides a content encoding system including multiple content encoders for receiving an uncompressed signal and for encoding content of the uncompressed signal as primary streams based upon control parameters. An encoder rate controller receives signals from the multiple content encoders and encoding target data and outputs the control parameters to the multiple content encoders and encoding meta data. A server receives the primary streams, encapsulates the primary streams into packets, receives the encoding meta data, and outputs encapsulated target data based upon the encoding meta data. An encapsulator rate controller receives the encapsulating target data and outputs rate control commands and supplemental enhancement information (SEI) message parameters. An encapsulator receives the primary signals from the server, receives the rate control commands and SEI message parameters from the encapsulator rate controller, outputs signals to the encapsulator rate controller, and composes a spliced stream.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized, and structural and functional modifications may be made without departing from the scope of the present invention.

Figure 1:
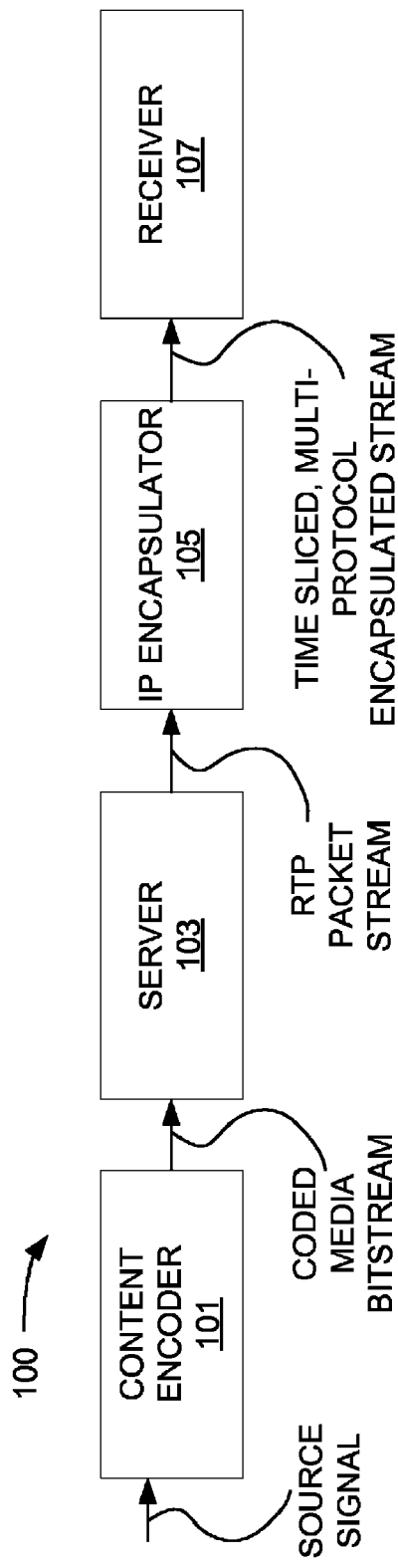
FIG. 1 illustrates an example block diagram of an IP data casting system over DVB-H protocol in accordance with at least one aspect of the present invention.

FIG. 1 illustrates an example block diagram of an IP data casting system 100 over DVB-H protocol in accordance with at least one aspect of the present invention. As shown, a content encoder 101 receives a source signal in analog format, uncompressed digital format, compressed digital format, or any combination of these formats. Content encoder 101 encodes the source signal into a coded media bit stream. Content encoder 101 may be capable of encoding more than one media type, such as audio and video. In addition, more than one content encoder 101 may be required to code different media types of the source signal. In some embodiments, content encoder 101 may also receive synthetically produced input, such as graphics and/or text. In still other embodiments, content encoder 101 may be capable of producing coded bit streams of synthetic media. In the following example Figures, the processing of one coded media bit stream of one media type is illustrated in the description. It should be understood by those skilled in the art, however, that real-time broadcast services may comprise several streams, such as audio, video, and text sub-titling streams and that the present invention is not so limited to the illustrative examples provided herein. Other aspects of the present invention may include many content encoders, although the following Figures and description consider one content encoder for descriptive purposes.

Returning to FIG. 1, the coded media bit stream is transferred to a server 103. Examples of the format used in the transmission include an elementary self-contained bit stream format, a packet stream format, or one or more coded media bit streams encapsulated into a container file. Content encoder 101 and server 103 may reside in a same physical device or may be included in separate devices. Content encoder 101 and server 103 may operate with live real-time content, in which case the coded media bit stream may not be stored permanently, but rather buffered for small periods of time in content encoder 101 and/or in server 103 to smooth out variations in processing delay, transfer delay, and coded media bit rate. Content encoder 101 may also operate considerably earlier than when the bit stream is transmitted from server 103. In such a case, the system may include a content database (not shown), which may reside in a separate device or in the same device as content encoder 101 and/or server 103.

Server 103 may be an IP multicast server using real-time media transport over Realtime Transport Protocol (RTP). Server 103 is configured to encapsulate the coded media bit stream into RTP packets according to an RTP payload format. In one embodiment, each media type has a dedicated RTP payload format. Although not shown in this Figure, the system 100 may contain more than one server 103.

Server 103 is connected to an IP encapsulator 105, such as a multi-protocol encapsulator. The connection between server 103 and an IP network may be a fixed-line private network. IP encapsulator 105 packetizes IP packets into multi-protocol encapsulation (MPE) sections which are further encapsulated into MPEG-2 transport stream packets. In at least one embodiment, IP encapsulator 105 may use MPE-FEC error protection described below.

MPE-FEC error protection is based on Reed-Solomon (RS) codes and is included in the DVB-H specifications to counter high levels of transmission errors. RS data is packed into a special MPE section so that an MPE-FEC-ignorant receiver can simply ignore MPE-FEC sections.

An MPE-FEC frame is arranged as a matrix with 255 columns and a flexible number of rows. Each position in the matrix hosts an information byte. The first 191 columns are dedicated to OSI layer 3 datagrams (hereinafter referred to as datagrams) and possible padding. These columns of the MPE-FEC frame are referred to as the application data table (ADT). The next 64 columns of the MPE-FEC frame are reserved for the RS parity information and are referred to as the RS data table (RSDT). The ADT may be completely or partially filled with datagrams. The remaining columns, when the ADT is partially filled, are padded with zero bytes and are referred to as padding columns. Padding is also used when there is no more space left in the MPE-FEC frame to fill the next complete datagram. The RSDT is computed across each row of the ADT using RS (255, 191). The entire 64 columns of the RSDT need not be computed and some of the rightmost columns of the RSDT may be completely discarded. Such a procedure is referred to as puncturing. Padding bytes and punctured columns are not sent over the transmission channel.

The process of receiving, demodulating, and decoding of a full bandwidth DVB-T signal would require substantial power and such power is not at the disposal of small handheld battery operated devices. To reduce the power consumption in handheld terminals, the service data is time-sliced, often by an IP encapsulator 105, before the service data is sent into the channel. When time-slicing is used, the data of a time-sliced service is sent into the channel as bursts, so that the receiver 107, using the control signals, remains inactive when no bursts are to be received. This reduces the power consumption in the receiver terminal 107. The bursts are sent at a significantly higher bit rate and an inter-time-slice period is computed such that the average bit rate across all time-sliced bursts of the same service is the same as when conventional bit rate management is used. For downward compatibility between DVB-H and DVB-T, the time-sliced bursts may be transmitted along with non-time-sliced services.

As known by those skilled in the art, time-slicing in DVB-H uses the delta-t method to signal the start of the next burst. The timing information delivered using the delta-t method is relative and is the difference between the current time and the start of the next burst. The use of the delta-t method removes the need for continuous synchronization between the transmitter and receiver 107. The delta-t method further provides great flexibility since parameters such as burst size, burst duration, burst bandwidth, and the off-times may be freely varied between elementary streams as well as between bursts within an elementary stream.

In accordance with aspects of the present invention, an IP data casting system over a DVB-H system may further include a radio transmitter configured to modulate and transmit an MPEG-2 transport stream signal over a radio access network. Aspects of the invention may be utilized for any wireless or fixed access network. Finally, in accordance with aspects of the present invention, the system may include one or more recipients, which may be configured to receive, demodulate, de-capsulate, decode, and/or render the transmitted signal, resulting in one or more uncompressed media streams. For example, a receiver 107 in accordance with aspects of the present invention may carry out receiving and de-modulation and then forward the resulting MPEG-2 transport stream to another device performing the remainder of the operation chain.

Tune-in delay refers to the time between the start of the reception of a broadcast signal and the start of the media rendering. Tune-in delay in broadcast/multicast may be summarized to consist of the following parts:

- Delay until the first packet of a FEC block is received. In DVB-H, this correlates to the delay until the next MPE-FEC frame carrying the desired streaming session (i.e. audio-visual service) arrives.
- Reception duration of a complete FEC block, an MPE-FEC frame in IPDC over DVB-H.
- Delay to compensate for the size variation of the desired streaming session within FEC blocks.
- Delay to compensate for the synchronization between the associated streams, e.g. audio and video, of the streaming session. In IPDC over DVB-H, it is assumed that the multicast server transmits audio and video in a synchronized manner and that the IP encapsulator is configured to construct such MPE-FEC frames that contain approximately equal playback range of all associated streams. Interleaving within a media stream, both transmission versus decoding order and decoding versus output order, complicates the operation.
- Delay until a media decoder is refreshed to produce correct output samples. In order to avoid accumulative buffering requirements for recipients, the interval of the reception of two consecutive FEC blocks is approximately equal to the media playback duration of the first FEC block. Consequently, when decoding and playback starts from the first FEC block, all the media samples of the block should be decoded for uninterrupted playback. However, if there are such media samples at the beginning of the first FEC block, in decoding order, that cannot be decoded without a reference to media samples in an earlier FEC block, their decoding is skipped and the start of the rendering process is delayed accordingly. Otherwise, if the decoding and rendering started immediately from a randomly accessible media sample, a gap in playback would result prior to the reception of the second FEC block. Thus, to enable fastest tune-in time, the first piece of data in a decoding order within an MPE-FEC frame should be accessible randomly, i.e., it should be able to decode it correctly. For example, an instantaneous decoding refresh (IDR) picture of an H.264/AVC video is randomly accessible.

Zapping support for IP data cast over DVB-H is specified as a part of the draft Electronic Service Guide (ESG) specification. The ESG specification provides a short description and other auxiliary information of the transmitted services. The ESG specification also provides IP address information of the services. By combining this information with DVB SI table information, a terminal is able to resolve where and with what parameters the selected services are transmitted. That information is used in the terminal and receiver when a user switches channels (e.g., audio-visual services or streaming sessions).

In the IP data cast service over DVB-H, any normal streamed service may be complemented by an associated zapping support. Zapping support can be provided to the user with two options, dynamic zapping and static zapping. Dynamic zapping occurs where the zapping support is not provided as part of the ESG data so that the zapping support may be dynamically changing. Dynamic zapping support is provided as a stream, which contains content to support the zapping such as a copy of the audio/video content with reduced quality, a still picture showing the latest snapshot out of the current video, and/or dynamic text such as subtitles. Static zapping occurs where the zapping support is provided inlined with ESG. The inlined data contains content to support the zapping such as a still picture giving the impression of the current A/V service, graphics, and/or simple text.

In accordance with one aspect of the present invention, coded video may be utilized. Aspects of the invention further relate to replacing coded pictures in a bit stream with another set of coded pictures. The H.264/AVC coding standard includes means for error-free picture switching known as SI and SP pictures.

Figure 2:
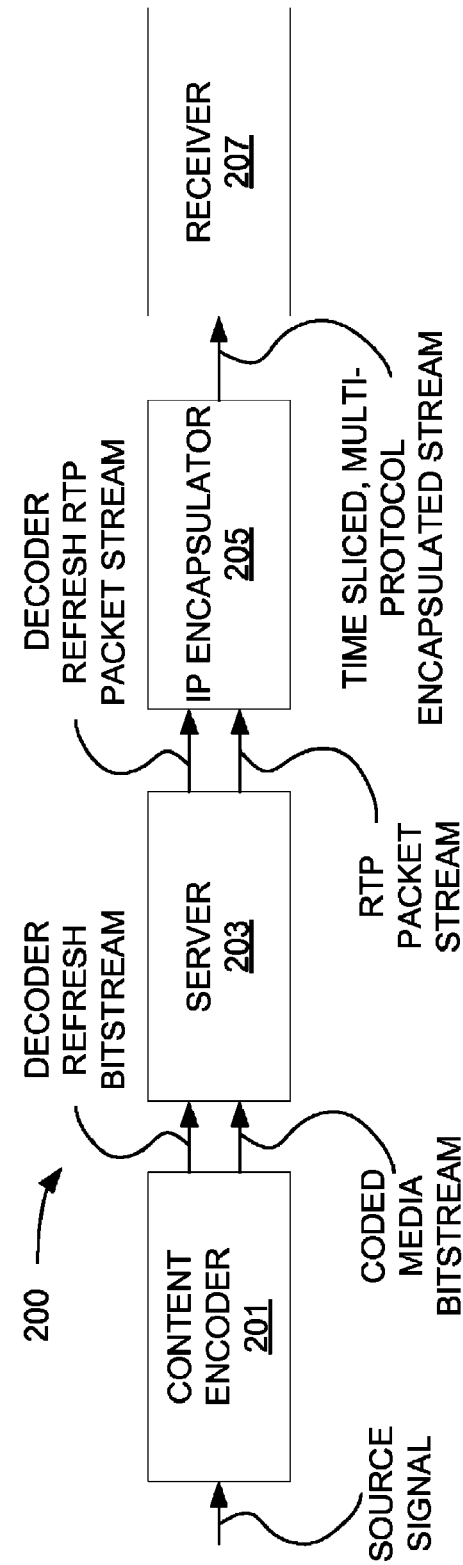
FIG. 2 illustrates another example block diagram of an IP data casting system over DVB-H protocol in accordance with at least one aspect of the present invention.

FIG. 2 illustrates another example block diagram of an IP data casting system 200 over DVB-H protocol in accordance with at least one aspect of the present invention. Content encoder 201 encodes two bit streams from the same source picture signal. A first stream, referred to as the decoder refresh bit stream, contains only intra or IDR pictures. For conventional coding standards, the decoder refresh stream may also contain sequence and Group of Pictures (GOP) headers. For the H.264/AVC standard, and derivatives such as Scalable Video Coding (SVC), the decoder refresh stream may also contain sequence and picture parameter sets provided that in-band parameter sets are used in the system. Content encoder 201 is further configured to encode a second stream, the coded media stream. Pictures originating from the same source picture signal are of similar quality in both streams. The decoder refresh stream is coded from the same original uncompressed source picture signal as the actual media stream with similar picture quality and the same or a sub-sampled picture rate. Reference pictures for inter prediction are limited for the spliceable pictures in the coded media stream, e.g., the pictures that correspond to the pictures in the intra/IDR stream.

Modern video coding schemes, such as H.264/AVC and H.263 with the optional enhanced reference picture selection mode, enable use of multiple reference pictures for inter prediction (a.k.a. motion estimation and compensation). The reference picture to be used in the prediction process is selected and signaled per a coding block. In order to start decoding from a particular coded picture and produce correct decoded pictures, it is necessary that no pictures earlier to the particular coded picture are used in the prediction process. Consequently, no picture prior to a spliceable picture in the decoding order is referred to in the inter prediction process of any reference picture at or after the spliceable picture in the decoding order. Non-reference pictures are such pictures that are not used as prediction reference for any other picture. Non-reference pictures that are predicted from the previous picture or pictures as well as the succeeding picture, in output order, are often used in video coding to improve compression efficiency. In order to maintain a good compression performance in association with randomly accessible intra pictures, non-reference pictures are often predicted from the succeeding randomly accessible intra picture. Similarly, non-reference pictures after the spliceable picture in the decoding order may refer to pictures earlier to the spliceable picture in the decoding order. These non-reference pictures might not be correctly decoded if the decoding process starts from the spliceable picture, but the non-reference pictures may be omitted as they are not used as reference for any other pictures.

The coded media bit stream and decoder refresh bit stream are transferred to a server 203. Server 203 may be an IP multicast server using real-time media transport over Real-time Transport Protocol (RTP). Server 203 is configured to encapsulate the coded media bit stream and the decoder refresh bit streams into RTP packets according to an RTP payload format. Server 203 may announce the available media streams to IP encapsulator 205 using SDP over RTSP, similarly to what is described above. To make the finding of corresponding samples in the RTP packet stream and in the decoder refresh stream more straightforward, server 203 may initialize the RTP timestamp to an equal offset for both of the streams. (That is, according to the RTP specification, the RTP timestamp is initialized to a random value at the beginning of an RTP session. Periodically transmitted RTCP sender reports contain information on the relation of RTP timestamps and the wallclock time of the sender. If an equal offset is not used, then the IP encapsulator must map the packets to the same timeline according to the RTCP sender reports rather than directly using the RTP timestamp to find the relation individual frames of the RTP packet stream and decoder refresh RTP packet stream.) Both the decoder refresh RTP packet stream and the RTP packet stream are transmitted from server 203 to an IP encapsulator 205. IP encapsulator 205 composes MPE-FEC frames, in which the first picture in the decoding order is an intra/IDR picture from the separate decoder refresh packet stream while the remainder of the pictures is from the RTP packet stream. The spliceable picture that was replaced by the intra/IDR picture is not included in the MPE-FEC frame for transmission to a receiver 207. The time sliced MPE-FEC frame stream is transmitted to the receiver 207 while the intra/IDR stream is not transmitted. Since there is an intra/IDR picture at the beginning of an MPE-FEC frame, in the decoding order, the tune-in time for newly-joined recipients is minimized.

When both the decoder refresh bit stream and coded media bit stream are transferred to server 203, they may be encapsulated to the same file. In such a case, the relationship between the two may be indicated in the file. For example, a file format derived from the ISO base media file format may be used, where a bit stream is encapsulated into a track, the value of alternate_group in the track header box for both bit streams may be identical indicating that the tracks are of the same origin and only one of them should be played at a time, and a new flag, sync_sample_track, in the track header box may be specified for the decoder refresh stream indicating that it contains only decoder refresh points, referred to as sync samples in the ISO base media file format terminology.

When the bit streams are transmitted by means of some transport protocol, their relationship may be indicated by the associated signalling protocol. In one example, each coding format has a specific RTP payload format, specifying the structure of the RTP payload for content of that coding format. Examples of RTP payload formats are specified in RFC 3984 for H.264/AVC video, in RFC 3016 for MPEG-4 Visual and Audio, and in RFC 2429 for H.263 video. For example, if the streams are transmitted over RTP, as specified in RFC 3550 and RFC 3551, and RTSP, as specified in RFC 2326, is used as the control protocol, the characteristics of the RTP streams are announced using session description protocol (SDP), as specified in RFC 2327. The server can use the SDP extension called "grouping of media lines," as specified in RFC 3388, to associate two RTP streams together. A new group attribute value may be specified, similarly to lip synchronization (LS) and flow identification (FID).

In accordance with aspects of the present invention, the new attribute may be referred to as random access point splicing (RAPS). The first value after the RAPS identification tag in the 'a=group' line indicates the media stream into which additional random access points may be inserted. The rest of the values indicate the media streams containing random access points that may be inserted to the first stream by replacing the corresponding frame in the first stream by the random access frame. An illustrative example of a session description protocol (SDP) description is provided below. Line "a=group:RAPS 1 2" indicates that RTP streams with identifiers "a=mid: 1" and "a=mid:2" are of the same origin and that the stream with "a=mid:2" contains random access points for the first stream. The rest of the provided SDP description is typical for streaming sessions.

```
v=0
o=Laura 289083124 289083124 IN IP4 one.example.com
t=0 0
c=IN IP4 224.2.17.12/127
a=group:RAPS 1 2
m=video 30000 RTP/AVP 98
a=rtpmap:98 H264/90000
a=fmtp:98  profile-level-id=42A01E; packetization-mode=0;
           sprop-parameter-sets=Z0IACpZTBYmI,aMljiA==
a=mid:1
m=video 30002 RTP/AVP 99
a=rtpmap:99 H264/90000
a=fmtp:99  profile-level-id=42A01E; packetization-mode=0;
           sprop-parameter-sets=Z0IACpZTBYmI,aMljiA==
i=This media stream contains the decoder refresh stream
a=mid:2
m=audio 30004 RTP/AVP 0
a=mid:3
```

Multiple options exist for arranging the operation of the content encoder 201 and the server 203. Content encoder 201 and server 203 may reside in the same physical device or they may be included in separate devices. Content encoder 201 and server 203 may operate with live real-time content, in which case the coded media bit stream and/or the decoder refresh stream may not be stored permanently, but rather buffered for small periods of time in content encoder 201 and/or in server 203 to smooth out variations in processing delay, transfer delay, and the coded media bit rate. Content encoder 201 may also operate considerably earlier than when the bit stream is transmitted from server 203. In such a case, the system 200 may include a content database (not shown), which may reside in a separate device or in the same device than content encoder 201 or server 203.

IP encapsulator 205 packetizes IP packets into multi-protocol encapsulation (MPE) sections which are further encapsulated into MPEG-2 transport stream packets. In accordance with at least one embodiment, IP encapsulator 205 may use MPE-FEC error protection as described above. When creating the application data for an MPE-FEC frame, IP encapsulator 205 replaces the first spliceable frame in the MPE-FEC frame with the corresponding frame from the decoding refresh stream. Similarly, if MPE-FEC protection is not used, IP encapsulator 205 replaces the first frame of a time-slice with the corresponding frame from the decoding refresh stream. The decoding refresh stream is not forwarded as such from IP encapsulator 205 to a receiver 207.

At least some of the decoded sample values of a spliceable picture and the corresponding intra/IDR picture in the decoder refresh stream may not be exactly equal. Thus, when a spliceable picture is replaced by an intra/IDR picture from the decoder refresh stream, the contents of the reference picture buffer of the decoder may differ from those of the encoder's reference picture buffer for the coded media bit stream. Due to inter prediction, a mismatch in one reference picture may propagate to any inter picture in the same inter prediction chain until the next intra or IDR picture starts a new inter prediction chain. However, an SI/SP picture coding technique could be used to avoid the mismatch altogether. The SI/SP coding technique enables derivation of identical decoded pictures from different coded pictures, even though the reference pictures for those coded pictures differ. The SI/SP pictures are included in the H.264/AVC coding standard and covered in academic publications. Thus they should be understood by those skilled in the art. The spliceable pictures are coded as SP pictures and pictures in the decoder refresh stream are SI pictures. Content encoder 201 ensures that the decoded sample values of a spliceable SP picture and the corresponding SI picture are equal.

The decoder refresh stream may also be used as the source for the dynamic zapping stream, provided that the picture size in terms of bytes and resolution is suitable. IP encapsulator 205 may forward any subset, including the full stream, of the decoder refresh stream as a video dynamic zapping stream. In another embodiment, IP encapsulator 205 may not insert pictures from the decoder refresh stream to the time-sliced MPE-encapsulated stream at all. Instead, IP encapsulator 205 provides a dynamic zapping stream that contains a picture corresponding to the first spliceable picture in each time slice. The possibility to use pictures from the dynamic zapping stream as decoder refresh points in the corresponding media stream is indicated to the receiver 207. The indication may be done, e.g., by a new attribute in the zapping support classification scheme specified in the ESG specification for IP data cast over DVB-H protocol. The receiver 207 may then start decoding of a media stream by decoding the picture in the dynamic zapping that is earliest in the MPE-encapsulated media stream and continuing decoding from the MPE-encapsulated media stream from packets after that in decoding order.

In an IP data casting (IPDC) system over DVB-H protocol, intra/IDR pictures may be encoded in an unsupervised fashion, typically as a response to scene changes or periodically at a constant intra/IDR rate. In the former situation, the expected tune-in delay may be a function of the scene change frequency. For example, if the average scene duration is 5 seconds, then the expected decoder refresh at tune-in takes approximately 2.5 seconds. In the latter situation, the intra/IDR picture frequency may be selected to make a suitable trade-off between compression efficiency and expected decoder refresh delay at tune-in. A typical intra/IDR picture is in the magnitude of being five times larger in terms of bytes corresponding to the same original picture coded as inter/P picture with similar quality. In conventional digital TV, in which bit rates ranging from 2 Mbps are typically used, intra pictures are typically inserted every 0.5 seconds. Therefore, the intra/IDR picture frequency in IPDC over DVB-H protocol is lower, e.g., in the range of 0.25 to 1 Hz. As such, the expected tune-in delay is cut 0.5 to 2.5 seconds compared to conventional IPDC systems over DVB-H protocol.

In accordance with video coding standards, a bit stream is defined as compliant when the bit stream can be decoded by a hypothetical reference decoder that is conceptually connected to the output of an encoder, and comprises at least a pre-decoder buffer, a decoder, and an output/display unit. This virtual decoder is referred to as a hypothetical reference decoder (HRD) in H.263 and H.264, and the video buffering verifier (VBV) in MPEG-4 Visual. Annex G of the 3GPP packet-switched streaming service standard (3GPP TS 26.234), specifies a server buffering verifier that may also be considered as an HRD, with the difference that it is conceptually connected to the output of a streaming server. Technologies such as the virtual decoder and buffering verifier are herein collectively referred to as hypothetical reference decoder (HRD). A bit stream is compliant if it can be decoded by the HRD without buffer overflow or underflow. Buffer overflow occurs if more bits are to be placed into the buffer when it is already full. Buffer underflow occurs if the buffer is empty at a time when bits are to be fetched from the buffer for decoding/playback.

HRD parameters may be used to impose constraints to the encoded sizes of pictures and to assist in deciding the required buffer sizes and start-up delay. In earlier HRD specifications before PSS Annex G and H.264, only the operation of the pre-decoded buffer is specified. This buffer is normally referred to as a coded picture buffer (CPB) in H.264. The HRD in PSS Annex G and H.264 HRD also specifies the operation of the post-decoder buffer, a decoded picture buffer (DBP) in H.264. Furthermore, earlier HRD specifications enable only one HRD operation point, while the HRD in PSS Annex G and H.264 HRD allows for multiple HRD operation points. Each HRD operation point corresponds to a set of HRD parameter values.

An H.264 HRD may be used to verify that bit streams comply with the H.264/AVC standard and as a reference for testing if a decoder implementation complies with the H.264/AVC standard. An H.264 HRD includes a coded picture buffer (CPB) for buffering of coded data and a decoded picture buffer (DPB) for buffering of decoded pictures. Both reference pictures for inter prediction and pictures to be reordered for output are stored in the DPB. The initial delay for CPB and DPB may be specified to allow video bit rate variation. AVC HRD allows two input modes, a constant bit rate mode (cbr_flag=1) and a "leaky bucket" mode (cbr_flag=0). Peaks in the required computations in the decoding process may be limited by specifying maximum input bit rate, maximum macroblock processing rate, and minimum compression ratio for profiles and levels. Video decoder implementations do not necessarily follow HRD/VBV strictly but rather a video decoder is compliant when it is able to decode all compliant bit streams in real-time.

H.264/AVC supplemental enhancement information (SEI) messages assist in processes related to decoding, display and other purposes. However, SEI messages are not required for constructing the luma or chroma samples by the decoding process. Decoders conforming to the H.264/AVC standard are not required to process SEI messages for output order conformance. SEI messages are included in the H.264/AVC standard to allow system specifications, such as the targeted 3GPP multimedia specifications, ISMA specifications, and DVB specifications, to interpret the supplemental information exactly the same way and hence interoperate. Encoders are required to follow the H.264/AVC standard when they create SEI messages. System specifications may require the use of particular SEI messages both in the encoding end and in the decoding end. Regardless of mandated use of any SEI messages, the bit stream still remains to be compatible with the H.264/AVC standard.

There are two SEI messages related to the operation of the HRD in the H.264/AVC standard. The HRD is initialized as specified by the buffering period SEI message, which includes the initial CPB buffering delay among other things.

The removal timing of access units from the CPB and output timing from the DPB are specified in the picture timing SEI message.

To minimize the propagation error and allow for HRD compliant spliced streams, the primary streams including intra/IDR, the decoder refresh streams, and Inter/P streams, the coded media bit stream, are encoded with similar quantization parameters and with a high relative quality. For the HRD compliancy the bit rate of spliced stream, i.e., the video bit stream at the output of an IP encapsulator 305 may be controlled. With equal quantization parameters, an intra/IDR frame might consume a bit budget 5 to 15 times more than the corresponding spliceable P frame. Therefore, equal quantization parameters for the spliceable frame and for the corresponding intra/IDR frames in two primary streams means that the control of bit rate only for one of the streams is possible. Furthermore the quantization parameters may be varied during encoding and many different combinations of IDR and P frames are possible for splicing.

When performing these actions of equal quantization parameters, controlling the stream rate and maintaining HRD compliancy of the spliced stream may be difficult. Controlling the rate control includes operations at a content encoder level and a server level. Considering an average number for the frequency of IDR frames in the spliced stream, HRD compliancy of the spliced streams at the content encoder level may be maintained as well. Furthermore metadata may be used by an encapsulator rate controller to provide the buffering information used in the buffering SEI messages and to provide more control on the bit rate of the spliced stream.

At the content encoder level, two encoders encode the content to provide the two primary streams. A common rate control system may be used for control of the encoders to provide a target bit rate for a spliced stream with a typical average number for the period or frequency of IDR spliced frames. Metadata may be provided according to controlling parameters and encoding results.

Figure 3:
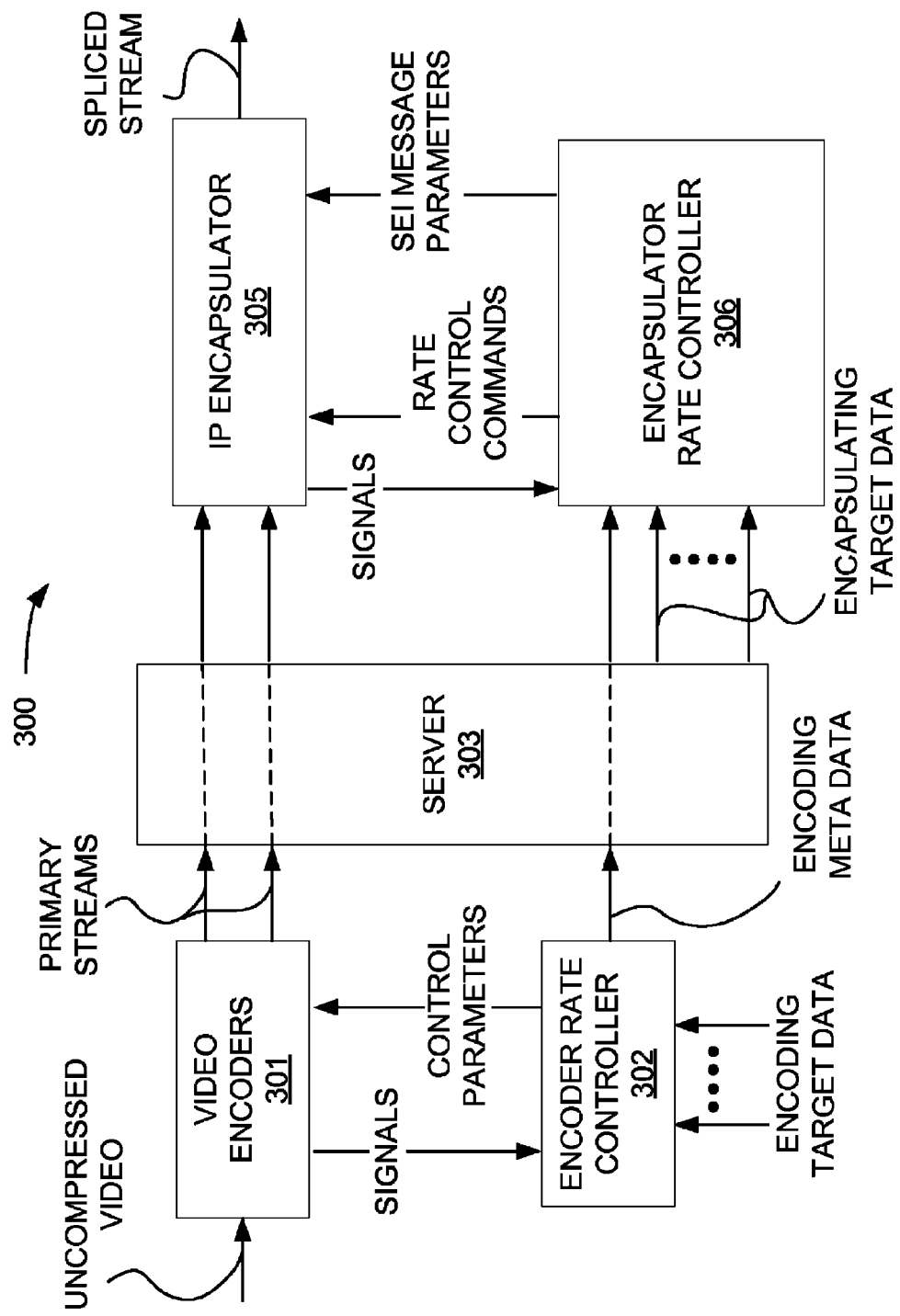
FIG. 3 illustrates an example block diagram of a rate control system in accordance with at least one aspect of the present invention.

FIG. 3 illustrates an example block diagram of a rate control system 300 in accordance with at least one aspect of the present invention. A general online application is considered in which no prior information about the video content is available and there is no feedback link from a server 303 to content encoders 301. In online applications, two encoders 301 encode the input uncompressed video to provide the primary streams including inter/P-stream and intra/IDR-stream. The primary streams are delivered by server 303 to an IP encapsulator 305 to make the spliced stream.

An encoder rate controller 302 controls the bit rate of primary streams according to encoding target data which may be set by a user and/or according to several signals which are extracted from the uncompressed and compressed video input. The encoding target data includes a target bit rate of the spliced stream and an IDR frequency of the spliced stream. The encoding meta data is complementary information which may be sent to IP encapsulator 305 at the start of encoding. An encapsulator rate controller 306 controls the rate of the spliced stream according to the encoding meta data, encapsulating target data, and several signals which are extracted from the primary streams. Other meta data, e.g., meta data used for offline applications, may be sent at the end of encoding.

Furthermore, SEI message parameters related to buffering of the spliced stream are provided by encapsulator rate controller 306. The encapsulating target data including the target bit rate of the spliced stream and the IDR frequency of the spliced stream may be homogeneous with the encoding target data. For example, in offline applications, it is possible to make a spliced stream with an IDR frequency which is different from the IDR frequency that is used for the rate control of the primary streams at the encoder 301.

Encoding target data includes user defined parameters for encoder rate controller 302. The user defined parameters may include a target bit rate of the spliced stream at the encoder 301 and an IDR frequency of the spliced stream at the encoder 301. Encapsulating target data includes server 303 defined parameters for the encapsulator rate controller 306. The server 303 defined parameters may include a target bit rate of the actual spliced stream at IP encapsulator 305 and an IDR frequency of the actual spliced stream at IP encapsulator 305. (The spliced stream at the encoder might not be produced, but some specifications for a desired spliced stream may be considered to control the bit rate of primary streams. These specifications may be similar to those of real spliced streams in online applications or they may be different in offline applications.) It should be understood by those skilled in the art that the encoding target data and encapsulating target data may have different values in offline applications.

Encoding meta data includes parameters which have been used or will be used for the rate control of primary streams. The parameters include a target bit rate of the spliced stream at encoder 301, an IDR frequency of the spliced stream at encoder 301, a virtual buffer size of encoder rate controller 302, and an average bit rate of primary streams.

Buffering SEI message parameters include an HRD coded picture buffer size, an initial coded picture buffer removal delay, and a target bit rate of the actual spliced stream at IP encapsulator 305.

A control parameter includes the quantization parameter. Depending on encoder rate controller 302, other encoding parameters may be used.

The input signals to encoder rate controller 302 are dependent on encoder rate controller 302. Different encoder rate controllers 302 may be used for the encoders 301 and each encoder rate controller 302 uses its own input signals.

Encapsulator rate controller 306 includes rate control commands to drop a number of frames from the MPE-FEC frame and to insert a number of extra IDR frames to the MPE-FEC frame.

Input signals to encapsulator rate controller 306 may include a size of IDR and P frames in the current MPE-FEC frame: $I_i$ and $P_i$ and an average bit rate of primary streams. Also, the HRD which is operating on encapsulator rate controller 306 provides another signal for encapsulator rate controller 306 including HRD coded picture buffer fullness. Still further, another virtual buffer, namely "virtual block buffer," is operating at IP encapsulator 305 and it signals to the rate controller by a virtual block buffer fullness.

Figure 4:
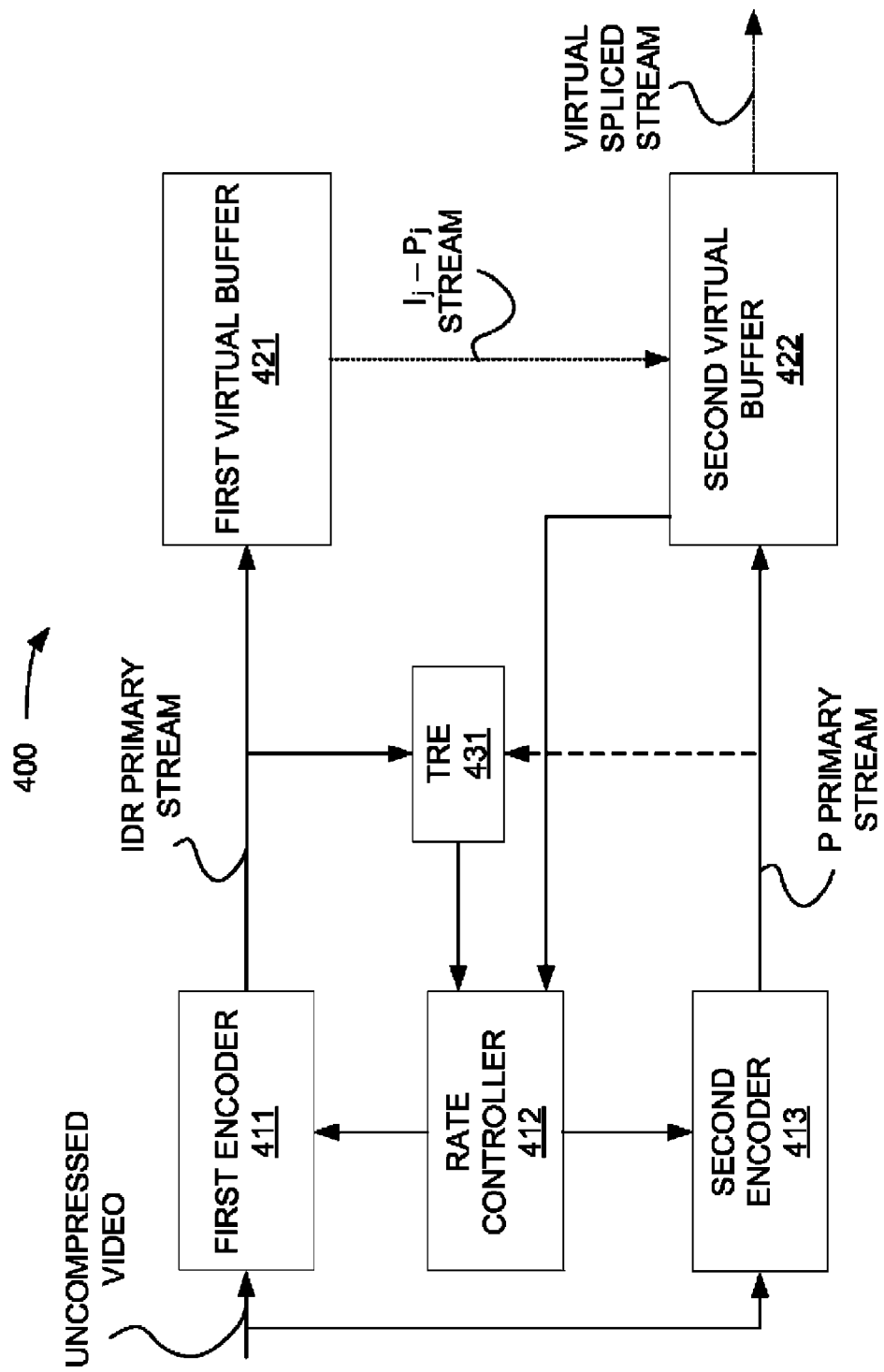
FIG. 4 illustrates an example block diagram of an encoder rate control system in accordance with at least one aspect of the present invention.

FIG. 4 illustrates an example block diagram of an encoder rate control system 400 at the content encoder level in accordance with at least one aspect of the present invention. Encoder rate control system 400 is configured to provide control on the rate of the splice stream by controlling the rate of primary streams and it minimizes the changes of encoding parameters to provide encoded video with high visual quality. The illustrated example describes real-time applications in which two separate encoders 411 and 413 encode the uncompressed video to provide the primary inter/P and intra/IDR streams. The two encoder blocks, i.e., 411 and 413 in FIG. 4 correspond to block 301 in FIG. 3. Blocks 412, 421, 422 and 431 of FIG. 4 correspond to block 302 in FIG. 3.

As shown, a first encoder 411 encodes an IDR stream and a second encoder 413 encodes the P stream. The output, P primary stream, of second encoder 413 is moved to a second virtual buffer 422 and the output of first encoder 411 is moved through a first virtual buffer 421 to second virtual buffer 422. Considering an average value for the IDR frequency, the first virtual buffer 421 is charged with one IDR frame at the location of IDR frequencies, and the first virtual buffer 421 is discharged gradually during the whole IDR period, i.e., an MPE-FEC frame period. The second virtual buffer 422 is discharged with the constant target rate of the spliced stream. A rate controller 412 provides equal quantization scales for both encoders 411 and 413 based on the fullness of the second virtual buffer 422 and based on the bit rate of the two encoded streams. A target rate estimation block (TRE) 431 estimates the target bit rate of the P primary stream according to the target bit rate of the spliced stream and the bit rate of the IDR primary stream. The target bit rate of P primary stream is updated once for each IDR period, i.e., MPE FEC frame. Rate controller 412 may be a variable bit rate (VBR) type video rate controller with buffer constraint. While no spliced stream might be produced at this time, the specifications of a desired spliced stream may be used for rate control of the primary streams. The spliced stream may be produced subsequently by the encapsulator.

The first virtual buffer 421 is configured to prevent high fluctuations in the second virtual buffer 422 results for relatively large IDR frames at the IDR frequency locations and is further configured to prevent fluctuations in encoding parameters, thereby providing high video quality. At the IDR frequency locations, difference of an encoded IDR frame and corresponding P frame may be inserted at once to the first virtual buffer 421 and then the difference may move gradually to the second virtual buffer 422 during the whole IDR period. The occupancy of the first virtual buffer 421 may be updated after encoding each replaced IDR frame as:

$$VBF1(i+1) = VBF1(i) + I_j - P_j - \frac{I_j - P_j}{F_1},$$

and the occupancy may be updated after encoding each P frame between two replaced IDR frames at IDR frequency locations as:

$$VBF1(i+1) = VBF1(i) - \frac{I_j - P_j}{F_1},$$

where VBF1 denotes the fullness of the first virtual buffer 421 and $I_j$ and $P_j$ show the bit budget used for encoding the IDR frame and the P frame, respectively, at an IDR frequency location of j. $F_1$ corresponds to how often an IDR frame is replaced by the P frame.

Depending on the type of rate controller 412, two models for the second virtual buffer 422 may be used, a sender buffer and a receiver buffer. In the case of a sender buffer, the second virtual buffer 422 is charged with the output of the second encoder 413 and the first virtual buffer 421, and the second virtual buffer 422 is discharged with the target rate of the spliced stream as:

$$VBF2(i+1) = VBF2(i) + P_i + \frac{I_j - P_j}{F_1} - \frac{TR_1}{FR}$$

In the case of a receiver buffer, the second virtual buffer 422 is charged with the target rate of the spliced stream and the second virtual buffer 422 is discharged with the output of the second encoder 413 and the first virtual buffer 421 as:

$$VBF2(i+1) = VBF2(i) - P_i - \frac{I_j - P_j}{F_1} + \frac{TR_1}{FR}$$

where VBF2 denotes the fullness of the second virtual buffer 422. $TR_1$ and FR correspond to the target rate and the frame rate of the spliced stream at the encoder level, respectively.

All video rate control algorithms use a target bit rate as a user defined input parameter. In accordance with aspects of the present invention, the target rate may be used as a controlled parameter that may be varied during encoding. Such a structure does not need any modification on the rate control algorithm and any variable rate controller with buffer constraint, such as rate controller 412, may be used without any modification. The target rate is adjusted by the target rate estimator (TRE) 431. The TRE 431 is configured to estimate the target bit rate of the P primary stream according to the target bit rate of the spliced stream and the bit rate of the primary streams. The target bit rate of the P primary stream may be updated once for each IDR period as:

$$TR_P = TR_1 - \tilde{R}_{I-P},$$
$$\tilde{R}_{I-P}(z) = H(z) \times R_{I-P}(z),$$
$$R_{I-P} = FR \times \frac{I_j - P_j}{F_1},$$

where $TR_P$ and $TR_1$ correspond to the target rate of the P primary stream and the spliced stream, respectively. $R_{I-P}$ corresponds to the extra bit rate result of the replaced jth P frame with the jth IDR frame and $\tilde{R}_{I-P}$ is a low-pass filtered version of $R_{I-P}$. The low-pass filter of H(z) smoothes the variation of the target rate for the P primary stream. The low pass filter minimizes variation of encoding parameters to maximize the visual quality of the spliced stream.

When there is a big difference between bit budgets of intra/IDR and inter/P frames in the primary streams, as a solution for the rate control, the IP encapsulator 305, as shown in FIG. 3, may drop a large number of frames to provide a HRD standard compliant bit stream. The rate control systems 300 and 400 shown in FIGS. 3 and 4 may be utilized together to provide a standard compliant bit stream with minimum number of dropped frames and with a high visual video quality.

In accordance with another embodiment of the present invention, "blind" splicing operations which result in HRD incompliance, e.g., overflow or underflow are prevented. Aspects of the present invention provide a method for an IP encapsulator to verify the HRD compliancy of the spliced stream, to control the bit rate of the spliced stream, and to derive the HRD buffering parameters for the spliced stream.

At an IP encapsulator, the primary streams may be spliced in an IDR frequency, even variable, which is different from the IDR frequency that is used for the rate control at the encoder level. This difference makes a drift from the target bit rate for the spliced stream. Such a drift may degrade the HRD compliancy of the spliced stream. To preserve the HRD compliancy of the spliced stream, the drift may be compensated by a fuzzy rate control at the encapsulator. According to the output of fuzzy controller, more spliceable P frames may be replaced by the corresponding IDR frames in an MPE-FEC frame to increase the bit rate or a number of P frames may be dropped from the spliced stream to decrease the bit rate. The fuzzy controller is configured to minimize the number of dropped frames and unnecessary IDR frames while it provides the target bit rate and HRD compliancy for the spliced stream.

Figure 5:
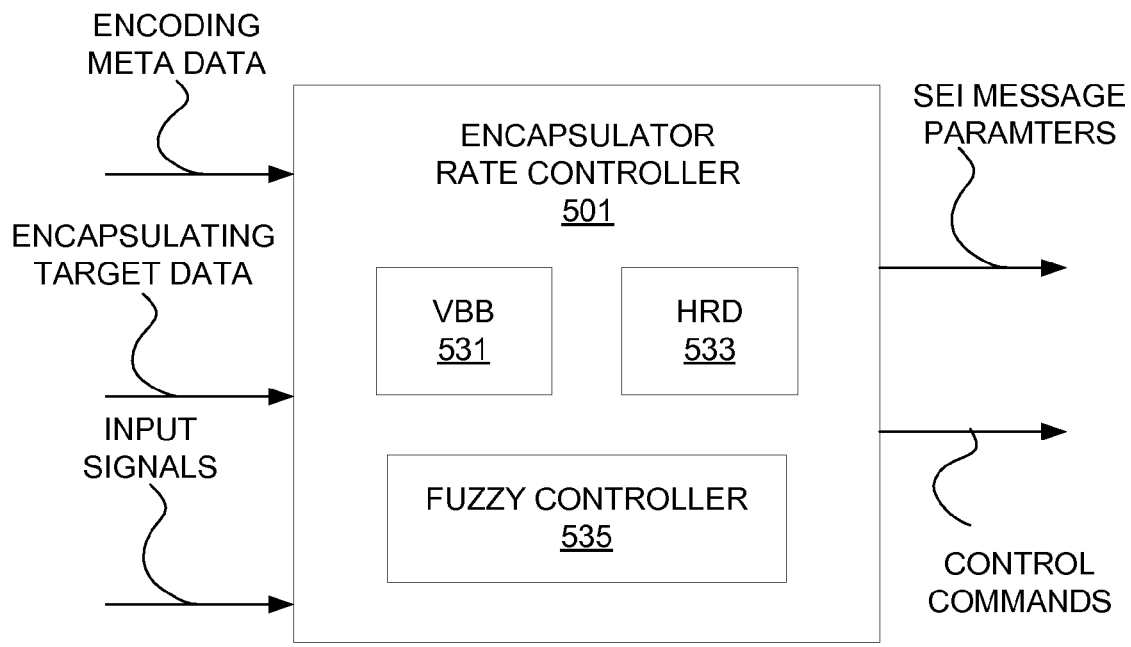
FIG. 5 illustrates an example block diagram of an encapsulator rate controller in accordance with at least one aspect of the present invention.

FIG. 5 illustrates an example block diagram of an encapsulator rate controller 501 in accordance with at least one aspect of the present invention. As shown, encapsulator rate controller 501 includes a fuzzy controller 535, a hypothetical reference decoder (HRD) 533, and a virtual block buffer (VBB) 531. Characteristics of HRD 533 and VBB 531 and also the outputs of encapsulator rate controller 501 may be defined according to the inputs described below.

Although not shown, a HRD coded picture buffer (CPB) may be operating in encapsulator rate controller 501. The CPB simulates the buffering of the spliced stream at the receiver side. The CPB is used for calculation of SEI message buffering parameters. The size of the HRD CPB may be specified by a video coding standard, e.g. Annex A of the H.264/AVC standard. In the lowest levels of H.264/AVC, the HRD CPB size corresponds to approximately 2.5 seconds of data at the maximum bit rate of the level in use. Furthermore, a provided model expresses the following relationship between size of an HRD CPB and a virtual buffer used by encoder rate controller 501:

$$BS_{Spliced}=BS_P+\text{mean}(I_i-P_i)+\alpha\times\text{Variance}(I_i-P_i),$$

where $BS_{Spliced}$ denotes the HRD CPB size and $BS_P$ is the size of a virtual buffer operating in encoder rate controller, i.e., the size of the second virtual buffer, such as the second virtual buffer 422 illustrated in FIG. 4. $P_i$ denotes the ith P frame replaced by the ith IDR frame or $I_i$. $\alpha$ is a constant content dependent coefficient.

In offline applications in which mean and variance of $(I_i-P_i)$ are available and considering a typical value for $\alpha$ in range of [2,10], the size of HRD CPB may be calculated as:

$$CPBS=\min(\text{Standard\_Limit},BS_{Spliced}).$$

In online applications in which no prior statistical information is available, the size of the HRD CPB may be set in a standard range. Then, using typical values for mean and variance of $(I_i-P_i)$ as follows, the size of an encoder virtual buffer may be computed:

First, the size of HRD CPB is set in standard range as:

$$CPBS=\Delta\times TR, \Delta\leq 3$$

Where TR is the Target Bit Rate of the spliced stream, and according to the provided model:

$$BS_P=CPBS-\text{mean}(I_i-P_i)-\alpha\times\text{Variance}(I_i-P_i).$$

In most video sequences, an IDR frame needs a bit budget about 5 to 10 times more than a P frame encoded with equal quantization scales. Therefore, $$\text{mean}(I_i-P_i)=\Omega\times\text{mean}(P_i), \text{Typically: } \Omega\in[4\_9].$$

Based on the assumption that:

$$\alpha\times\text{Variance}(I_i-P_i)=\text{mean}(P_i),$$

then, $$BS_P=CPBS-\Omega\times\text{mean}(P_i), \text{Typically: } \Omega\in[5\_10],$$

or approximately, $$BS_P\approx\Delta\times TR-\Omega\times\frac{TR}{FR}, \Omega\in[5\_10], \Delta\leq 3.$$

Then it may be concluded, $$BS_P\approx\left(\Delta-\frac{\Omega}{FR}\right)\times TR, \Omega\in[5\_10], \Delta\leq 3.$$

As an example, if $\Delta=3$ and $\Omega=7.5$ and $FR=15$, then $BS_P=2.5\times TR$.

The HRD CPB size for the SEI message is the same size of the HRD CPB operating in the encapsulator rate controller 501.

The initial removal delay for an SEI message may be calculated based on the fullness of the HRD CPB operating in the encapsulator as:

Initial\_CPB\_Removal\_Delay=HRD\_CPB Fullness before removing IDR frame/Target Rate Note that the "Initial_CPB_Removal_Delay" used herein may be calculated in seconds while the value of "initial_cpb_removal_delay" used in standard documents has been scaled.

If the IDR frequency used in an encoder rate controller is equal to the IDR frequency use by the encapsulator, the target rate of the spliced stream at the encapsulator is similar to the target rate of the spliced stream at the encoder. Otherwise it may be computed as:

$$TR_2=TR_1\cdot\frac{F_1}{F_2}\cdot\frac{R_P(F_2-1)+R_{IDR}}{R_P(F_1-1)+R_{IDR}},$$

where $TR_1$ and $TR_2$ denote the target bit rate of the spliced stream at the encoder and the encapsulator, respectively. $F_1$ and $F_2$ provide a ratio of "Target Frame Rate" to "IDR Frame Rate" and correspond to how often an IDR frame is inserted by the encoder rate control and the encapsulator, respectively. $R_P$ and $R_{IDR}$ denote the average bit rate of the P primary and IDR streams. For online applications, which in $R_P$ and $R_{IDR}$ are not available, it may be assumed that:

$$R_{IDR}/R_P=I_j/P_j=n,$$

Then, $$TR_2=TR_1\cdot\frac{F_1}{F_2}\cdot\frac{(F_2-1)+n}{(F_1-1)+n},$$

where a typical number for n is 9.

Encapsulator rate controller 501 controls the bit rate by controlling the frame rate and type of frames. Controller 501 may drop a number of P frames from an MPE-FEC frame or it may replace one or more P frames by IDR frames. This control may be implemented in three steps: 1) drop frame before fuzzy control; 2) drop\replace frame by the fuzzy control; and 3) replace frame after fuzzy control.

A fuzzy controller 535 and a virtual block buffer 531, which is operating based on an MPE-FEC frame, are used for implementation of the above control steps. In the first step, a number of video frames, P or IDR, are dropped from the beginning of the MPE-FEC frame, based on the fullness of the virtual buffer, or HRD-CPB, and the size of the IDR frame, if the receiver buffer is closed to underflow conditions. The receiver buffer fullness can be determined by one of two available buffers at the IP encapsulator. In the second step, dropping frames, P or IDR, or replacing of frame, P frames with IDR frames, is performed based on the output of fuzzy controller 535. The output of fuzzy controller 535 may be an integer number. A positive number shows the number of dropped frames from the end of a MPE-FEC frame and a negative number shows that a number of extra IDR frames are available for insertion or replacement to the middle of the MPE-FEC frame with a uniform distribution along the MPE-FEC frame. In the last step, one P frame may be replaced by an IDR frame according to the virtual buffer 531 fullness and size of remaining video frames in the MPE-FEC frame if receiver buffer is close to overflow.

As described, the output of fuzzy controller 535 may be an integer value which shows the number of frames that should be dropped from the current block, MPE-FEC frame, or the number of P frames that should be replaced by the IDR frames in the current block. Fuzzy controller 535 may be configured to utilize a virtual buffer 531 which is operating based on the MPE-FEC frame not the video frame. Fuzzy controller 535 may use the following signals as inputs:

$$INPUT1 = BB \times \frac{FR}{TR_2} - F_2,$$

$$INPUT2 = \frac{BBF - f(I_i - P_i)}{BBS},$$

where BB (Block_Bits) denotes the total number of bits consumed by the current MPE-FEC frame before any process including dropping or replacing frames. BBF and BBS denote the block buffer fullness and block buffer size, respectively. FR denotes the target frame rate. $f(I_i-P_i)$ is an output of a low pass filter implemented on the $(I_i-P_i)$, i.e., $$F(z) = H(z) \times (I_i - P_i), \quad H(z) = \frac{m}{m+1-z^{-1}},$$

where H(z) denotes the impulse response of the low pass filter.

IF_THEN fuzzy rules are summarized in Table 1.

The content of Table 1 specifies the output of the controller. For example:

IF (INPUT1 is VH and INPUT2 is ML) THEN (Output is MH).

The letters H, L, M, V, X and S correspond to linguistic specifications of High, Low, Medium, Very, Extremely, and Super which describe the fuzzy parameters.

Figure 6:
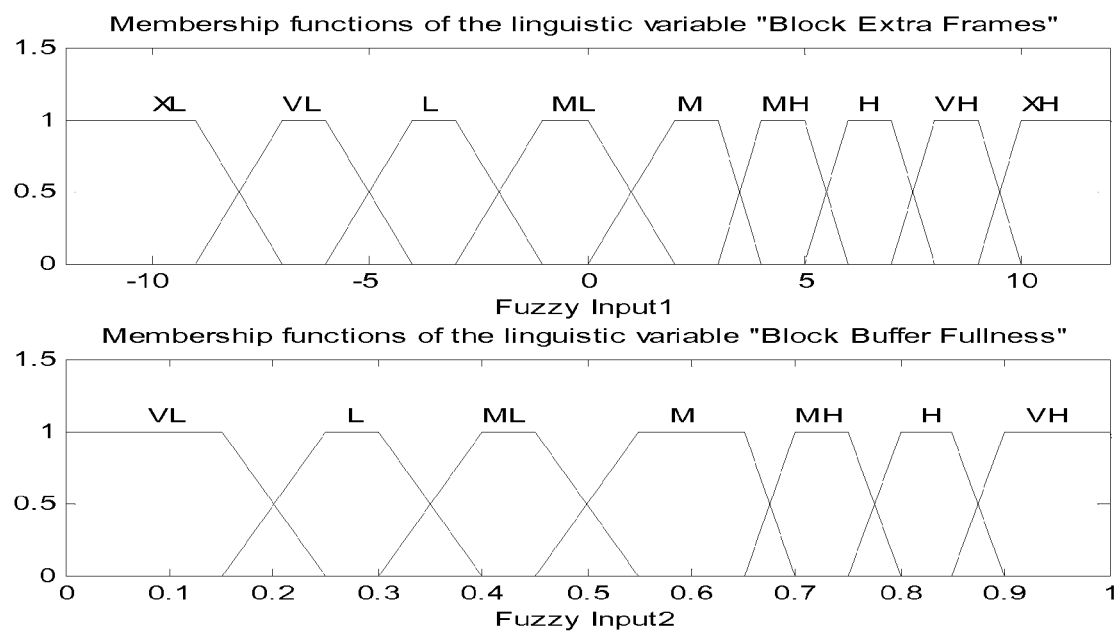
FIG. 6 illustrates examples of fuzzy membership functions of linguistic variables "Block Extra Frames" and "Block Buffer Fullness" in accordance with at least one aspect of the present invention.

The distribution of fuzzy membership functions (MSF) are shown in FIG. 6. The desired central values for the output of the fuzzy system corresponding to Table 1 are shown in the Table 2. Although good results are provided by the above MSFs and desired values, more optimization by a large database of video sequences is possible.

TABLE 1

Linguistic Rules of the Fuzzy Controller

| INPUT1 | XL | M | M | M | M | ML | L | VL |
|---|---|---|---|---|---|---|---|---|
| | VL | M | M | M | M | M | ML | ML |
| | L | M | M | M | M | M | M | ML |
| | ML | M | M | M | M | M | M | M |
| | M | MH | M | M | M | M | M | M |
| | MH | H | MH | M | M | M | M | M |
| | H | VH | H | MH | M | M | M | M |
| | VH | XH | VH | H | MH | M | M | M |
| | XH | SH | XH | VH | H | MH | M | M |
| | | VL | L | ML | M | MH | H | VH |
| | | | | | INPUT2 | | | |

TABLE 2

Central Desired Values for the Output of Fuzzy Controller

| INPUT1 | XL | 0 | 0 | 0 | 0 | −1 | −2 | −3 |
|---|---|---|---|---|---|---|---|---|
| | VL | 0 | 0 | 0 | 0 | 0 | −1 | −1 |
| | L | 0 | 0 | 0 | 0 | 0 | 0 | −1 |
| | ML | 0 | 0 | 0 | 0 | 0 | 0 | 0 |
| | M | 1 | 0 | 0 | 0 | 0 | 0 | 0 |
| | MH | 2 | 1 | 0 | 0 | 0 | 0 | 0 |
| | H | 3 | 2 | 1 | 0 | 0 | 0 | 0 |
| | VH | 4 | 3 | 2 | 1 | 0 | 0 | 0 |
| | XH | 5 | 4 | 3 | 2 | 1 | 0 | 0 |
| | | VL | L | ML | M | MH | H | VH |
| | | | | | INPUT2 | | | |

A fuzzy system with two inputs using a product inference engine, a singleton fuzzifier, and a centre average defuzzifier which is:

$$f(x_1, x_2) = \frac{\sum_{i_1=1}^{N_1} \sum_{i_2=1}^{N_2} \bar{y}^{i_1 i_2} \mu_{A_1^{i_1}}(x_1) \cdot \mu_{A_2^{i_2}}(x_2)}{\sum_{i_1=1}^{N_1} \sum_{i_2=1}^{N_2} \mu_{A_1^{i_1}}(x_1) \cdot \mu_{A_2^{i_2}}(x_2)},$$

where $f(x_1,x_2)$ is an approximated output and $\{A_i^1, A_i^2, \ldots, A_i^{N_i}\}_{i=1,2}$ are fuzzy sets with $\{\mu_{A_1^{i_1}}(x_1)\}_{1 \leq i_1 \leq N_1}$ and $\{\mu_{A_2^{i_2}}(x_2)\}_{1 \leq i_2 \leq N_2}$ membership functions defined for inputs $x_1$ and $x_2$ may be used. The centre of output fuzzy set ($B^{i_1 i_2}$), denoted by $\bar{y}^{i_1 i_2}$, may be chosen as output desired values using supervisor experiences. An output of fuzzy controller 535 may be a non-integer number so it may be rounded to the nearest integer number. A positive output illustrates that a number of video frames should be dropped from the current MPE-FEC frame and a negative output illustrates that a number of P frames should be replaced by the corresponding IDR frames in the current MPE-FEC frame.

Virtual block buffer 531 may be a virtual buffer which operates in the encapsulator rate controller 501 based on the MPE-FEC frame and not the video frame. Virtual block buffer 531 has a model which may be a simplified version of HRD CPB. The size of virtual block buffer 531 may be equal to the size of HRD CPB which is operating at the encapsulator. Virtual block buffer 531 may be used by fuzzy controller 535. Although the overflow and underflow conditions of the virtual block buffer 531 and HRD CPB may not be exactly matched to each other, the overflow and underflow conditions may be checked by both of them. Buffer occupancy of the virtual block buffer 531 may be updated once after encapsulation of each MPE-FEC frame as:

$$BBF(i+1) = BBF(i) - CBB(i) + \frac{TR_2 \times F_2}{FR},$$

where i denotes the index of the MPE-FEC frame and CBB, Coded Block Bits, corresponds to the total amount of bits consumed by the video frames in the encapsulated MPE-FEC frame. During the rate control process, the buffer occupancy may be updated according to dropped and replaced frames, i.e.:

$$BBF(i+1) = BBF(i+1) + \overset{Dropped}{\sum} P_n + \overset{Dropped}{\sum} I_m - \overset{Replaced}{\sum}(I_j - P_j).$$

As described, encapsulator rate controller 501 controls the rate of the spliced stream by the dropping or replacing of frames. The dropping and replacing may be implemented in three steps. The main control is provided in the second step according to the output of the fuzzy controller 535 and control in the first and third steps is implemented in underflow or overflow conditions.

In step one, if the HRD CPB is close to underflow conditions, to prevent under flow at the low occupancy buffer conditions, a number of video frames may be dropped from the beginning of the MPE-FEC frame:

if(Close to Underflow)⇒Then (Drop IDX number of frames)

where IDX is an index of splicing in primary streams or minimum distance between two IDR or spliceable P frames. When the first spliceable frame is dropped, the following P frames up to the next spliceable P frame are removed and the first next spliceable P frame is replaced with the corresponding IDR frame.

The underflow condition may be checked by the early simulation of HRD 533 or by the virtual block buffer 531. In the case of using the virtual block buffer 531, a simple condition may be used as:

if(BBF+$\Delta_1$<IDR)⇒Close to Underflow, where $\Delta_1$ is a margin.

In the case of using HRD 533, operating the checking operations should be undone from the buffer 533. The main simulation on the HRD 533 may be implemented after the step three.

In step two, dropping or replacing of frames may be implemented based on the output of the fuzzy controller 535. The output of the fuzzy controller 531 may be an integer number.

In step three, if the HRD CPB is close to overflow, one P frame may be replaced by the corresponding IDR frame to prevent overflow condition:

if(Close to Overflow)⇒then (Replace one P-frame with IDR frame).

The overflow condition may be checked by the early simulation of HRD 533 or by the virtual block buffer 531. In the case of using the virtual block buffer 531:

if(*BBF*≧*BBS*−$\Delta_2$)⇒Close to Overflow, where $\Delta_2$ is a margin.

In the case of using HRD 533, operating the checking operations should be undone from the buffer before the final simulation.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

What is claimed is:

1. A system for bit stream transmission comprising:
    an encoding sub-system configured to receive a source signal and to encode a first and a second bit stream based on the source signal, the encoded first bit stream including a decoder refresh bit stream and the encoded second bit stream including a media bit stream; and
    an encapsulator, operatively connected to the encoding sub-system, configured to receive the encoded first bit stream and the encoded second bit stream, to replace a spliceable picture from the encoded second bit stream, and to compose a time-sliced stream.

2. The system of claim 1, wherein the encoding sub-system comprises:
    a content encoder configured to receive the source signal and to encode the first bit stream and the second bit stream based on the source signal; and
    a server, operatively coupled to the content encoder, configured to receive the encoded first bit stream and encoded second bit stream and to encapsulate the encoded first and second bit streams into packets,
    wherein the encapsulator is operatively coupled to the server, and configured to receive the packets from the server.

3. The system of claim 1, wherein the time-sliced stream comprises a Multi-Protocol Encapsulation (MPE) stream.

4. The system of claim 1, wherein the decoder refresh bit stream includes at least one of intra pictures and instantaneous decoding refresh (IDR) pictures.

5. The system of claim 1, wherein the decoder refresh bit stream includes sequence and Group of Pictures (GOP) headers.

6. The system of claim 1, wherein the decoder refresh bit stream includes sequence and picture parameter sets.

7. The system of claim 2, wherein the server comprises an Internet protocol (IP) multicast server.

8. The system of claim 2, wherein the server is further configured to encapsulate the encoded first and second bit streams into packets based upon a payload format.

9. The system of claim 1, wherein the spliceable picture is the first picture of a time slice in the time-sliced stream.

10. The system of claim 1, wherein the encapsulator replaces the spliceable picture with a picture from the encoded first bit stream.

11. The system of claim 10, wherein the picture from the encoded first bit stream is one of an intra picture and an instantaneous decoding refresh (IDR) picture.

12. The system of claim 10, wherein the picture from the encoded first bit stream is coded as an SI picture.

13. The system of claim 1, wherein the spliceable picture is coded as an SP picture.

14. The system of claim 2, wherein the packets comprise Realtime Transport Protocol (RTP) packets.

15. The system of claim 1, wherein the encapsulator is further configured to encapsulate the time-slice MPE stream into Moving Pictures Experts Group-2 (MPEG-2) transport stream packets.

16. The system of claim 2, wherein the content encoder and the server physically reside within a single device.

17. The system of claim 1, wherein the encoding sub-system is further configured to buffer at least one of the decoder refresh bit stream and the media bit stream.

18. The system of claim 1, wherein the encapsulator is further configured to compose the time-sliced MPE stream into MPE forward error correction (MPE-FEC) frames.

19. The system of claim 18, wherein the encapsulator is further configured to replace a first spliceable frame from the MPE-FEC frames with a corresponding frame from the encoded first bit stream.

20. The system of claim 1, wherein the encapsulator is further configured to output at least a subset of the decoder refresh bit stream as a video dynamic zapping stream.

21. A method of composing a time-sliced stream, the method comprising steps of:
receiving a source signal including first and second bit streams;
encoding the first and second bit streams, the encoded first bit stream including a decoder refresh bit stream and the encoded second bit stream including a media bit stream;
encapsulating the encoded first and second bit streams into packets;
replacing a spliceable picture from the encapsulated encoded second bit stream with a picture from the encapsulated encoded first bit stream; and
composing a time-sliced stream including the picture from the encapsulated encoded first bit stream.

22. The method of claim 21, wherein the composing step comprises composing a time sliced multi-protocol encapsulation (MPE) stream.

23. The method of claim 21, wherein the decoder refresh bit stream includes at least one of intra pictures and instantaneous decoding refresh (IDR) pictures.

24. The method of claim 21, wherein the spliceable picture is the first picture in the encoded second bit stream.

25. The method of claim 24, further comprising the step of replacing the spliceable picture with a picture from the encoded first bit stream.

26. The method of claim 25, wherein the picture from the encoded first bit stream is one of an intra picture and an instantaneous decoding refresh (IDR) picture.

27. The method of claim 26, wherein the picture from the encoded first bit stream is coded as an SI picture.

28. The method of claim 22, further comprising the step of composing the MPE stream into MPE forward error correction (MPE-FEC) frames.

29. The method of claim 21, further comprising a step of outputting at least a subset of the decoder refresh bit stream as a video dynamic zapping stream.

30. A content encoding system comprising:
an encoding sub-system comprising:
a first content encoder configured to receive an uncompressed signal and to encode first content of the uncompressed signal as a first primary stream based upon control parameters,
a second content encoder configured to receive the uncompressed signal and to encode second content of the uncompressed signal as a second primary stream based upon the control parameters, and
an encoder rate controller, operatively connected to the first and second content encoders, configured to receive first input signals from the first and second content encoders and encoding target data and to output the control parameters to the first and second content encoders and to output encoding meta data,
an encapsulator rate controller, operatively connected to the encoding sub-system, configured to receive second input signals and encapsulating target data and to output rate control commands and supplemental enhancement information (SEI) message parameters; and
an encapsulator, operatively connected to the encoding sub-system and the encapsulator rate controller, configured to receive the first and second primary signals from the encoding sub-system, to receive the rate control commands and SEI message parameters from the encapsulator rate controller, to output the second input signals to the encapsulator rate controller, and to compose a spliced stream.

31. The content encoding system of claim 30, wherein the encoding sub-system further comprises a server, operatively connected to the first and second content encoders and the encoder rate controller, configured to receive the first and second primary streams, to encapsulate the first and second primary streams into packets, and to receive the encoding meta data and to output the encapsulated target data based upon the encoding meta data, and
wherein the encapsulator rate controller and the encapsulator are operatively connected to the server.

32. The content encoding system of claim 30, wherein the first input signals are extracted from the uncompressed signal.

33. The content encoding system of claim 30, wherein the first and second primary streams include at least one of: an inter stream, a P stream, an intra stream and an instantaneous decoding refresh (IDR) stream.

34. The content encoding system of claim 30, wherein the encoder rate controller is further configured to control a bit rate of the first and second primary streams in accordance with the encoding target data.

35. The content encoding system of claim 34, wherein the encoding target data corresponds to user-defined data.

36. The content encoding system of claim 34, wherein the encoding target data is based upon the first input signals.

37. The content encoding system of claim 30, wherein the encoding target data includes a target bit rate of the spliced stream and an instantaneous decoding refresh (IDR) frequency of the spliced stream.

38. The content encoding system of claim 37, wherein the encapsulated target data is homogeneous with the encoding target data.

39. The content encoding system of claim 30, wherein the encapsulator rate controller is further configured to control a bit rate of the spliced stream based upon the encapsulated target data.

40. The content encoding system of claim 39, wherein the encapsulator rate controller is further configured to control the bit rate of the spliced stream based upon the second input signals.

41. The content encoding system of claim 40, wherein the second input signals correspond to signals extracted from the first and second primary streams.

42. The content encoding system of claim 30, wherein the SEI message parameters correspond to buffering of the spliced stream.

43. The content encoding system of claim 30, wherein the encoding meta data includes parameters, the parameters including at least one of: a target bit rate of the spliced stream, an instantaneous decoding refresh frequency of the spliced stream, a virtual buffer size of the encoder rate controller, and an average bit rate of the first and second primary streams.

44. The content encoding system of claim 30, wherein the SEI message parameters include at least one of: a hypothetical reference decoder coded picture buffer size, an initial coded picture buffer removal delay, and a target bit rate of the splice stream.

45. The content encoding system of claim 30, wherein the control parameters include a quantization parameter.

46. The content encoding system of claim 30, wherein the spliced stream includes portions of the first and second primary streams.

47. The content encoding system of claim 46, wherein the rate control commands include commands to insert an instantaneous decoding refresh (IDR) frame into the spliced stream.

48. The content encoding system of claim 47, wherein the rate control commands include one or more commands to drop a number of frames from the first and second primary streams.

49. A method of composing a spliced stream, the method comprising steps of:
   receiving an uncompressed signal;
   encoding first content of the uncompressed signal as a first primary stream based upon control parameters;
   encoding second content of the uncompressed signal as a second primary stream based upon the control parameters;
   encapsulating the first and second primary streams into packets;
   outputting encapsulating target data based upon encoding meta data;
   outputting rate control commands and supplemental enhancement information (SEI) message parameters based upon the encapsulating target data; and
   composing a spliced stream from the first and second primary streams based upon the rate control commands and SEI message parameters.

50. The method of claim 49, further comprising a step of extracting input signals for an encoder rate controller from the uncompressed signal.

51. The method of claim 49, wherein the first and second primary streams include at least one of: an inter stream, a P stream, an intra stream and an instantaneous decoding refresh (IDR) stream.

52. The method of claim 49, further comprising a step of controlling a bit rate of the first and second primary streams in accordance with encoding target data.

53. The method of claim 52, wherein the encoding target data corresponds to user-defined data.

54. The method of claim 49, wherein the SEI message parameters correspond to buffering of the spliced stream.

55. The method of claim 49, wherein the encoding meta data includes parameters, the parameters including at least one of: a target bit rate of the spliced stream, an instantaneous decoding refresh frequency of the spliced stream, a virtual buffer size of the encoder rate controller, and an average bit rate of the first and second primary streams.

56. The method of claim 49, wherein the SEI message parameters include at least one of: a hypothetical reference decoder coded picture buffer size, an initial coded picture buffer removal delay, and a target bit rate of the splice stream.

57. A content encoding system comprising:
   a first encoder configured to receive an uncompressed signal and to encode first content of the uncompressed signal as an instantaneous decoding refresh (IDR) primary stream;
   a second content encoder configured to receive the uncompressed signal and to encode second content of the uncompressed signal as a P primary stream;
   a rate controller, operatively connected to the first and second encoders, configured to output equal quantization scales to the first and second encoders;
   a first virtual buffer, operatively connected to the first encoder, configured to receive the IDR primary stream and to output the IDR primary stream;
   a second virtual buffer, operatively connected to the second encoder and the first virtual buffer, configured to receive the IDR primary stream and the P primary stream and to output data representative of the fullness of the second virtual buffer; and
   a target rate estimation block, operatively connected to the first and second encoders, the second virtual buffer, and the rate controller, configured to estimate a target rate of the P primary stream based upon a target bit rate of a spliced stream and a bit rate of the IDR primary stream.

58. The content encoding system of claim 57, wherein the target bit rate of the P primary steam is updated for each IDR period.

59. The content encoding system of claim 57, wherein the rate controller is a variable bit rate (VBR) type video rate controller with buffer constraint.

60. The content encoding system of claim 57, wherein the first virtual buffer is further configured to be charged with one IDR frame at a location of IDR frequencies and to be discharged during an IDR period.

61. The content encoding system of claim 60, wherein the second virtual buffer is further configured to be discharged with a constant target rate of the spliced stream.

62. The content encoding system of claim 58, wherein at IDR frequency locations in the IDR primary stream, the first virtual buffer is further configured to receive an entire encoded IDR frame and to gradually output the encoded IDR frame to the second virtual buffer during an IDR period.

63. A system for rate control of an encapsulator, the system configured to receive a first and a second primary signal, wherein the first primary signal includes a decoder refresh bit stream and the second primary signal includes a media bit stream, and both the decoder refresh bit stream and the media bit stream derived from the same original signal, the system configured to control a bit rate of a spliced stream, wherein the system is configured to form a spliced stream based on the second primary signal by replacing at least one part of the second primary signal by a part of the first primary signal.

64. The system of claim 63, further including a code picture buffer (CPB).

65. The system of claim 64, wherein the CPB is configured to simulate the buffering of the spliced stream at a receiver.

66. The system of claim 65, wherein the system is further configured to calculate supplemental enhancement information (SEI) message parameters based on the CPB.

67. The system of claim 63, wherein the system is further configured to output control commands to drop at least one P frame from a multi-protocol encapsulated—forward error correction (MPE-FEC) frame.

68. The system of claim 63, further comprising a virtual block buffer (VBB).

69. The system of claim 68, wherein the output control commands are based on a fullness of the VBB.

70. The system of claim 67, further including a code picture buffer (CPB), wherein the output control commands are based on a fullness of the CPB.

71. The system of claim 67, wherein the output control commands are based on a size of an instantaneous decoding refresh (IDR) frame.

72. The system of claim 63, wherein the system is further configured to replace at least one P frame of a multi-protocol encapsulated-forward error correction (MPE-FEC) frame by an instantaneous decoding refresh (IDR) frame.

73. The system of claim 63, further comprising a fuzzy controller configured to output a number.

74. The system of claim 73, wherein the number is a positive number representative of a number of P frames to be dropped from the MPE-FEC frame.

75. The system of claim 73, wherein the number is a negative number representative of a number of P frames to be replaced with instantaneous decoding refresh (IDR) frames in the MPE-FEC frame.

* * * * *